United States Patent [19]
Hasegawa et al.

[11] 3,952,388
[45] Apr. 27, 1976

[54] MACHINE TOOL APPARATUS

[75] Inventors: Kazuhiko Hasegawa, Toyota; Yoshio Shima, Obu; Shigeo Noda, Nagoya, all of Japan

[73] Assignees: Toyoda Koki Kabushiki Kaisha; Toyota Jidosha Kogyo Kabushiki Kaisha, both of Japan

[22] Filed: July 22, 1974

[21] Appl. No.: 490,364

[30] Foreign Application Priority Data
July 24, 1973 Japan.............................. 48-83397

[52] U.S. Cl. ................................. 29/33 P; 29/563; 198/19; 198/38
[51] Int. Cl.²............................................ B23Q 7/00
[58] Field of Search .................... 29/563, 564, 33 P; 214/11 R; 198/19, 38

[56] References Cited
UNITED STATES PATENTS

| | | | |
|---|---|---|---|
| 3,280,659 | 10/1966 | Allen ................................ | 29/563 X |
| 3,530,571 | 9/1970 | Perry .................................. | 29/33 P |
| 3,543,392 | 12/1970 | Perry et al. ........................... | 29/563 |
| 3,576,540 | 4/1971 | Fair et al. .......................... | 29/563 X |
| 3,854,889 | 12/1974 | Lemelson.......................... | 29/563 X |

Primary Examiner—Willie G. Abercrombie
Assistant Examiner—W. R. Briggs
Attorney, Agent, or Firm—Oblon, Fisher, Spivak, McClelland & Maier

[57] ABSTRACT

Machine tool apparatus for handling routine pallets and priority pallets with loading and unloading stations comprising a plurality of machine tools for performing machining operations on a workpiece mounted on a pallet; main conveyer means for carrying a pallet in one direction, buffer conveyer means for storing a pallet to be loaded onto a machine tool; return conveyer means for returning a pallet to an unloading station; pallet transfer means for moving a pallet among the conveyer means, stations and machine tools; and central control means for controlling the machine tools and the conveyer means; the pallet transfer means being responsive to the central control means for carrying a priority pallet from the main conveyer means to one of the machine tools and being responsive to the central control means for moving a routine pallet from main conveyer means to the buffer conveyer means and from the buffer conveyer means to one of the machine tools only when the machine tool on which the routine pallet is to be loaded is not reserved by a priority pallet and is not being occupied by another pallet.

10 Claims, 12 Drawing Figures

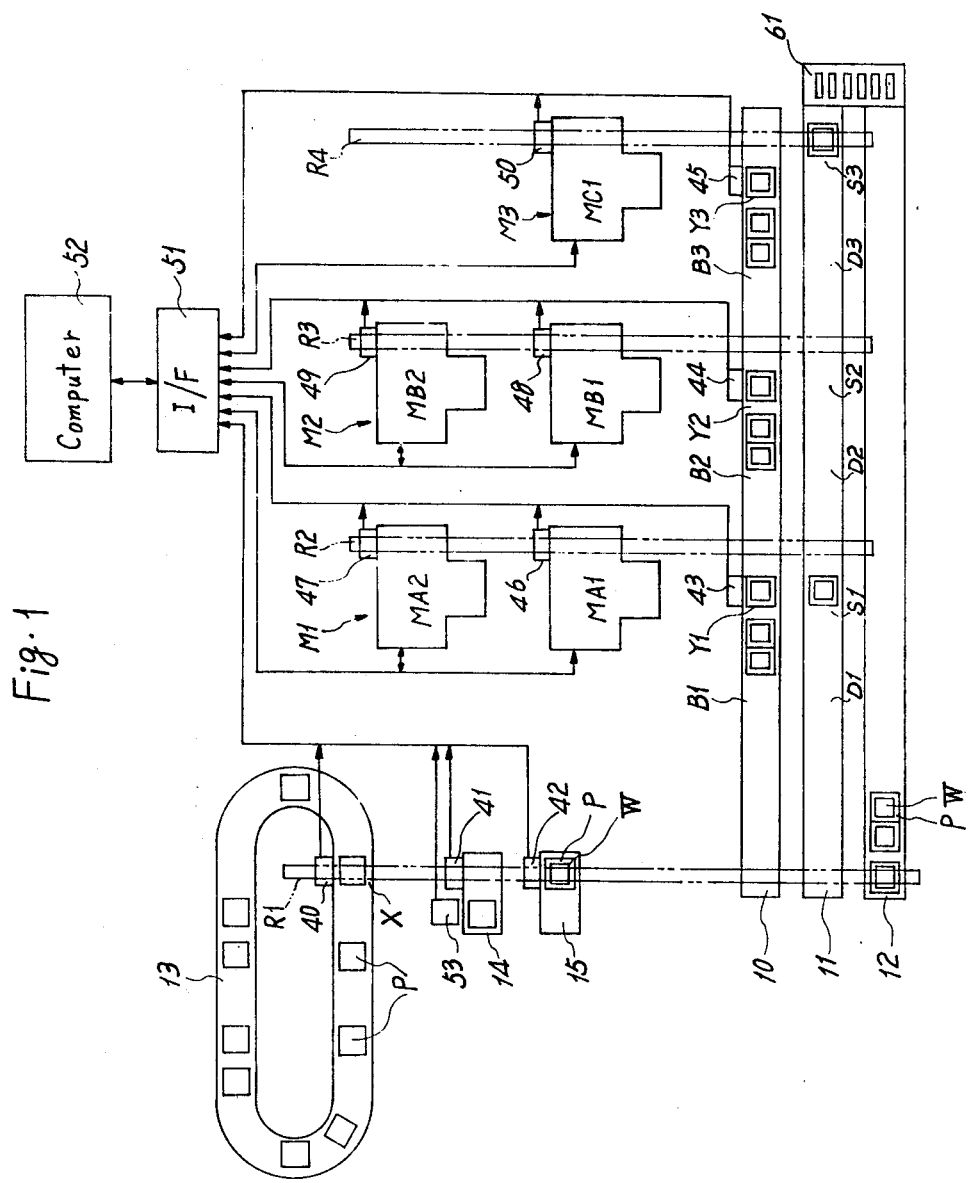

| Pallet No. | Work. No. | Priority | Pallet Route | | | |
|---|---|---|---|---|---|---|
| P1 | W1 | 0 | 12 | 20 | 31 | |
| P2 | W2 | 0 | 10 | 21 | 31 | |
| P3 | W3 | 1 | 11 | 20 | 00 | |
| P4 | W4 | 0 | 00 | 21 | 31 | |
| P5 | W5 | 1 | 10 | 22 | 00 | |
| Pn | Wn | 0 | 11 | 22 | 31 | |

| Machine No. | Priority Pallet Reservation |
|---|---|
| MA1 | 1 |
| MA2 | 0 |
| MB1 | 0 |
| MB2 | 0 |
| MC1 | 0 |

| Storage Area No. | Storage Area Use | Storage Area Reservation |
|---|---|---|
| D1 | 1 | 0 |
| D2 | 0 | 0 |
| D3 | 0 | 0 |

| Stop Position No. | Pallet Destination |
|---|---|
| S1 | MA1 |
| S2 | 0 |
| S3 | 0 |

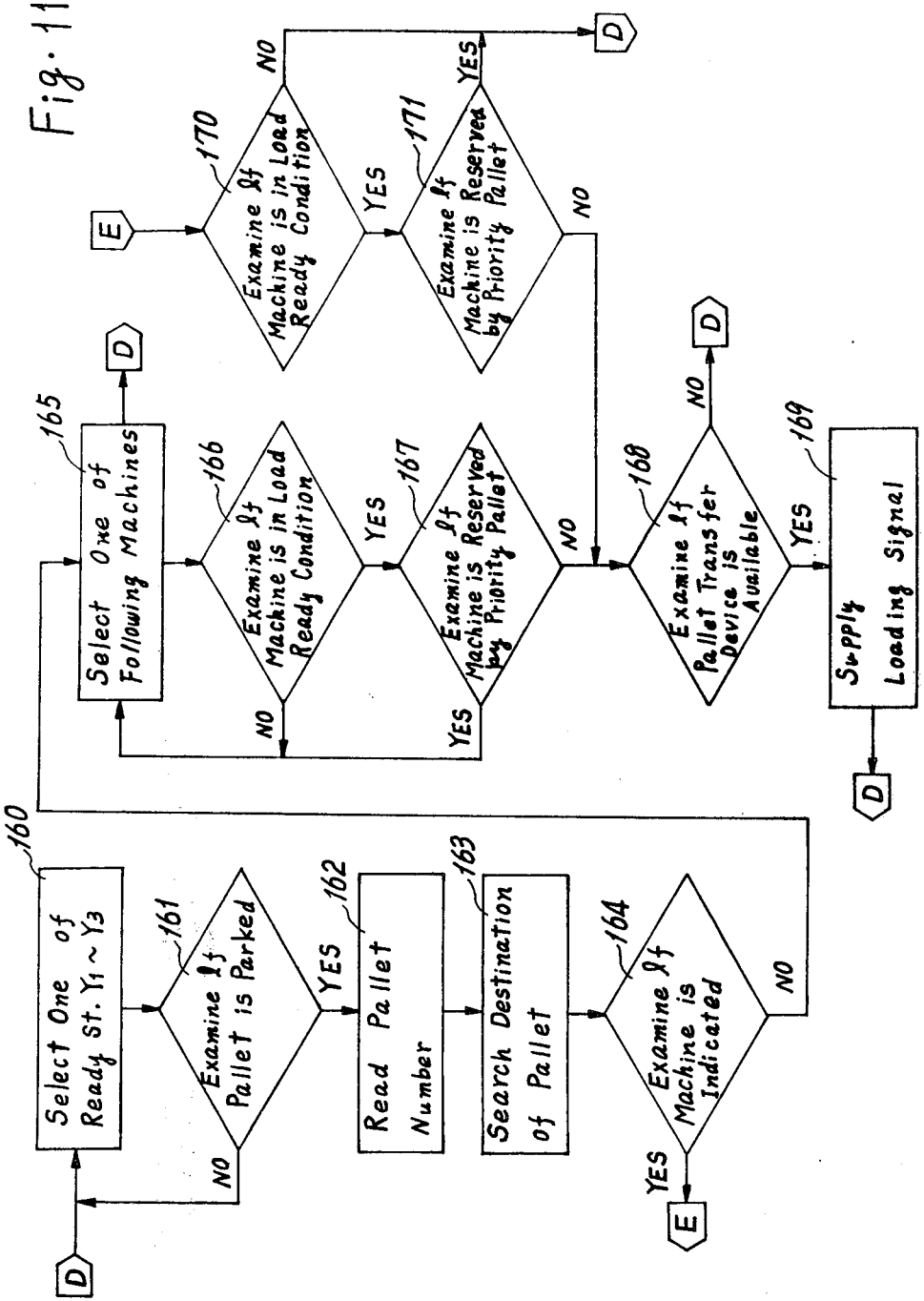

MACHINE TOOL APPARATUS

BACKGROUND OF THE INVENTION

1. Field of the Invention

The present invention relates to machine tool apparatus wherein machine tools perform machining operations on workpieces mounted on pallets which are moved by conveyors.

2. Description of the Prior Art

In conventional machine tool apparatus wherein machine tools perform machining operations on workpieces mounted on pallets which are moved by conveyors, the machining operations are performed in accordance with the sequence of loading operations and this sequence can not be changed even if it is desired that a certain workpiece be machined on a priority basis.

SUMMARY OF THE INVENTION

It is, therefore, an object of the present invention to provide machine tool apparatus wherein a workpiece may be taken out of sequence and machined on a priority basis.

Another object of the present invention is to provide machine tool apparatus wherein a priority pallet is directly loaded onto a machine tool while a routine pallet is loaded onto a machine tool after first being transferred to a buffer area.

Still another object of the present invention is to provide machine tool apparatus wherein a routine pallet is not loaded onto a machine tool which has been reserved for a priority pallet.

A further object of the present invention is to provide machine tool apparatus wherein a priority pallet is directly loaded onto a machine tool on a priority basis as long as the machine tool has not been reserved by another priority pallet.

A still further object of the present invention is to provide machine tool apparatus wherein a routine pallet is moved only when a buffer area is available for the routine pallet.

The foregoing and other objects are achieved according to this invention through the provision of machine tool apparatus for handling routine pallets and priority pallets with loading and unloading stations comprising a plurality of machine tools for performing machining operations on a workpiece mounted on a pallet; main conveyer means for carrying a pallet in one direction; buffer conveyer means for storing a pallet to be loaded onto a machine tool; return conveyer means for returning a pallet to an unloading station; pallet transfer means for moving a pallet among the conveyer means, stations and machine tools; and central control means for controlling the machine tools and the conveyer means; the pallet transfer means being responsive to the central control means for carrying a priority pallet from the main conveyer means to one of the machine tools and being responsive to the central control means for moving a routine pallet from main conveyer means to the buffer conveyer means and from the buffer conveyer means to one of the machine tools only when the machine tool on which the routine pallet is to be loaded is not reserved by a priority pallet and is not being occupied by another pallet.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts throughout the several views and wherein:

FIG. 1 is a schematic view of the numerically controlled machine tool apparatus;

FIG. 4 shows a reference listing;

FIG. 5 is a machine reservation listing and illustrates a machine tool reserved by a priority pallet;

FIG. 6 is a conveyer occupation listing and illustrates a storage area which is being used or reserved;

FIG. 7 is a destination listing for illustrating the destination to which the pallet is carried;

FIG. 11 is a routine pallet loading flow chart.

DETAILED DESCRIPTION OF THE PREFERRED EMBODIMENT

Figure 3:
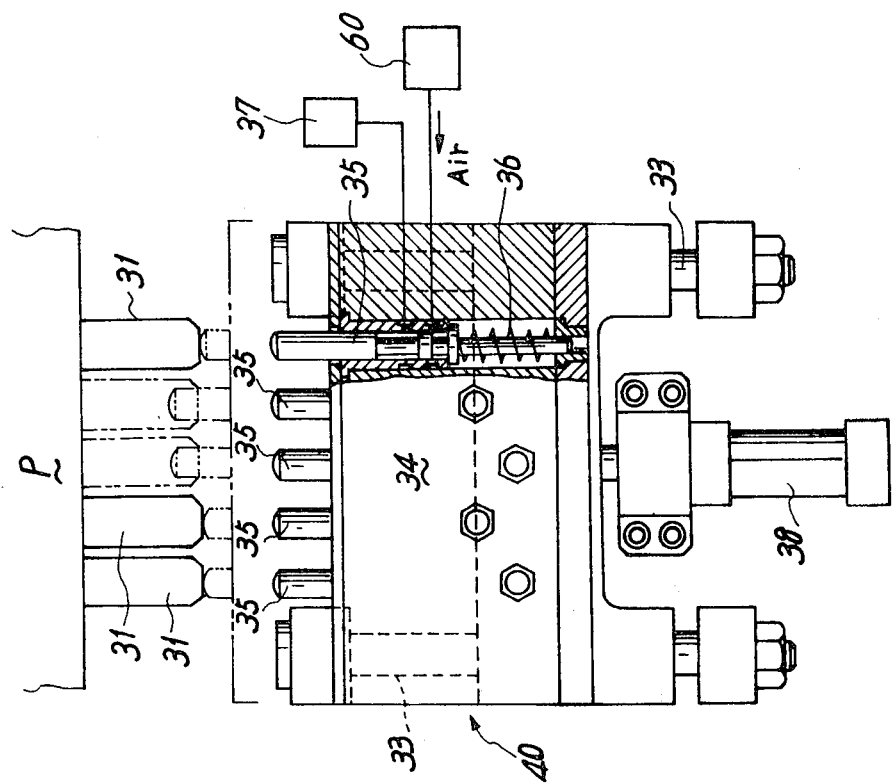
FIG. 3 shows a pallet identification device.

Referring now to the drawings, wherein like reference characters refer to identical or corresponding parts throughout the several views, there is shown in FIG. 1, a buffer conveyer 10, a main conveyer 11 and a return conveyer 12 for transferring a plurality of pallets P disposed in parallel relation with one another. A plurality of railways R1 to R4 which are disposed transversely of the conveyors 10, 11 and 12 are provided above the conveyers and the machine tools. Below the first railway R1, there is provided pallet pool 13 in the form of a loop, loading station 14 at which a variety of workpieces are loaded on pallets by an operator and unloading station 15 at which the workpieces are removed from the pallets. Under the second railway R2, there is provided a first module M1 including numerically controlled (NC) machine tools MA1, MA2 which may perform milling and boring operations on the workpieces respectively. Arranged under the third railway R3 is a second module M2 including a pair of NC machine tools MB1, MB2 which may perform drilling operations on the workpieces. Under the fourth railway R4, there is a third module M3 including a NC machine tool MC1 which may perform tapping operations.

The buffer conveyer 10 comprises three buffer areas B1, B2 and B3 at the railways R1, R2, R3 and R4. Non-priority pallets having workpieces to be machined by the first module M1 are stored in the first buffer area B1. The first or front pallet in the first buffer areas B1 is parked at a ready station Y1 by a stop member (not shown) while it waits to be loaded into the machine tool MA1 or MA2. When it is required to be loaded into the machine tool, the front pallet is moved to a position right under the second railway R2. Similarly, the second and third buffer areas may respectively store pallets having workpieces to be machined by the second and third modules M2, M3 which pallets are moved into ready stations Y2 and Y3 one by one. Limit switches are provided at the ready stations Y1, Y2 and Y3 so as to determine the presence of the pallets thereat.

The main conveyer 11 is also divided into three storage areas D1, D2 and D3, at the front portions of which stop members (not shown) are retractably provided. Pallets which are to be transferred into either the first module M1 or second buffer area B2 are parked by means of the stop members within the first storage area D1. When required to be transferred, the pallet parked at a first stop position is indexed into a position right under the second railway R2. Similarly, the pallets which are to be transferred into either the second module M2 or the third buffer area B2 are parked within the second storage area D2. The pallets to be transferred into the third module M3 are also parked within the third storage area D2. A limit switch (not shown) is provided at each of the stop positions for confirming the presence of a pallet thereat.

Figure 2:
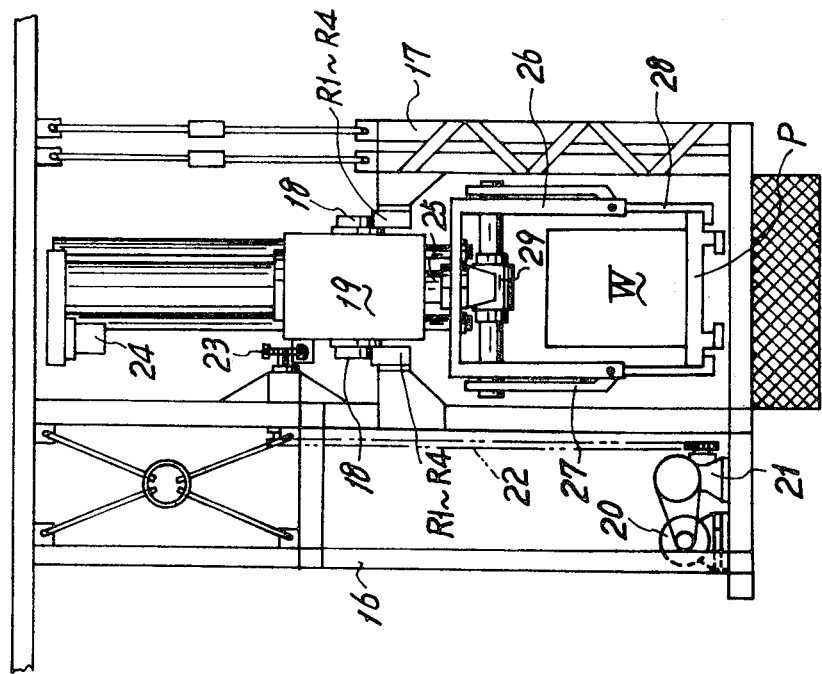
FIG. 2 shows a pallet transfer device according to the present invention.

Referring now to FIG. 2, each of the railways R1-R4 is supported by suspension frames 16, 17 which are fixedly mounted on the ceiling of a factory. A pallet transfer device 19 is supported on the railways through rollers 18. The pallet transfer device 19 is moved on the railways R1-R4 by a drive motor 20 through reduction gear 21, transmission mechanism 22 and chain mechanism 23. The pallet transfer device 19 is provided with a support shaft 25 which is moved up and down by a drive motor 24 and is connected with a suspension block 26. A pair of arms 17, 18 is pivotably mounted on the suspension block 26 and is operated by means of a drive motor 29 so as to retain or release the pallet P therefrom.

The pallet transfer device 19 supported by the railway R1 is operable to transfer the pallets P between the pallet pool 13 and the loading and unloading stations 14, 15 and between the loading and unloading stations and the conveyers 10, 11, 12. The pallet transfer devices 19 supported by the railways R2–R4 are respectively operable to transfer the pallets P among buffer conveyer 10, main conveyer 11 and NC machine tools MA1 to MC1.

Five dogs can be detachably mounted on the side of the pallet P as shown in FIG. 3. One of the five dogs 31 is used for parity checking while the remaining ones constitute binary coded signals to identify each pallet. Provided at a position right under the first railway R1 is a pallet take-out station X to which the pallets are successively indexed. When the pallet P is indexed to the pallet take-out station X, a pallet identification device 40 detects the pallet number.

The pallet identification device 40, as shown in FIG. 3, includes a head 34 slidably mounted on pilot bars 33 which are, in turn, mounted on machines. Five rods 35 are slidably mounted on the head 34 and are normally biased toward the front side thereof by means of spring means 36 so that an air source 60 is not connected to pressure detectors 37. When the head 34 is advanced by means of a hydraulic actuator 38, some of the detector rods 35 are moved relative to the head 34 against the forces of the spring means 36 by the engagement with the dogs 31 mounted on the pallet P so that the air source 60 is connected with the pressure detectors 37. Accordingly, the arrangement of the dogs 31 is changed into binary coded signals by means of the pressure detectors 37 and thus, the pallet number is identified. Pallet identification devices 41 to 50 identical to the device 40 (FIG. 3) are respectively provided at the ready stations Y1, Y2 and Y3 and NC machine tools MA1 to MC1 so that the pallet numbers on the pallets at such positions may be identified.

The NC machine tools MA1 to MC1, pallet identification devices 40 to 50, pallet transfer devices 19 and the conveyers are connected to a computer 52 through an interface 51 so as to exchange information such as, for example, machining data, pallet numbers, pallet destinations, etc.

Computer 52 may be a conventional mini-computer of small capacity, such as for example, a Data General Corporation Nova computer. The interface 51 is also conventional and can be made from a general purpose interface Nova model made by Data General Corporation. A card reader 53 which is adapted to send the workpiece numbers on the pallets to the computer 52 through the interface 51 is provided at the loading station 14.

A reference listing RT (FIG. 4) which includes information concerning pallet numbers, workpiece numers, priorities and pallet routes is stored in the memory means of the computer 52. The pallet route location of the reference listing RT is divided into plural positions in accordance with the machining processes. In each portion, there are two digit numbers. The first two digit number represents the identification of the module to which the pallet is to be directed and the second two digit number represents the identification of the machine tool in the selected module. For example, when the three two digit numbers 11-20-00 appear in the pallet route location, the first number, 11, represents that the pallet is to be loaded onto the first machine tool MA1 of the first module M1 at the first stage; the second number, 20, represents that the pallet is to be loaded onto the second module M2 at the second stage although any machine tool in the second module will suffice and the third number, 00, represents that the pallet is not to be loaded onto the third module M3 at the third stage M3.

The memory means of the computer 52 also stores a machine reservation listing MR (FIG. 5), a conveyer occupation listing CS (FIG. 6) and a destination listing IT (FIG. 7) which respectively include information concerning machine tools reserved by priority pallets, storage areas on main conveyer 11 reserved by priority pallets and being used by pallets, and pallet destinations of pallets P parked at the stop positions on main conveyer 11.

The memory means of the computer can further store priority pallet instructions (FIGS. 8A, 8B), loading instructions (FIG. 9), routine pallet transfer instructions (FIG. 10) and routine pallet loading instructions (FIG. 11). The priority pallet transfer instructions are for transferring a priority pallet in the machine tool apparatus, the loading instructions are for loading the pallets into the machine tools or the buffer areas from the stop positions provided on the main conveyer 11, the routine pallet transfer instructions are for transferring a routine pallet in the machine tool apparatus and the routine pallet loading instructions are for loading a routine pallet into the machine tools from the ready stations provided on the buffer conveyer 10.

These priority pallet transfer instructions, loading instructions, routine pallet transfer instructions and routine pallet loading instructions are sequentially repeated at predetermined intervals.

The operation of the above mentioned embodiment will now be described with reference to the drawings.

When a workpiece having, for instance, a workpiece number W3 is required to be machined, an operator provides a card indicating the workpiece W3 into the card reader 53 at the loading station 14. The pallet number for the workpiece W3, in this case the pallet number P3, is searched by the computer 52 in accordance with the reference listing RT (FIG. 4). The pallet pool 13 is actuated in accordance with the instruction from the computer 52 and the pallet number on the pallet P indexed into the pallet take-out station X is read out by the pallet identification device 40 and is compared with the pallet number P3 stored in the computer 52. When the pallet having the pallet number P3, that is, the pallet P3 is indexed into the pallet take-out station X, the actuation of the pallet pool 13 is terminated. Thus, the pallet P3 is transferred to the loading station 14 by means of the pallet transfer device 19 supported by the first railway R1. At the loading station 14, the operator mounts the workpiece W3 on the pallet P3 and turns on a switch (not shown) in order to provide a waiting signal which indicates that the pallet P3 is ready to be transferred from the loading station 14. This situation is referred to as a transfer ready condition.

When the priority pallet transfer instructions (FIGS. 8A, 8B), which are repeated at predetermined intervals, are processed in the transfer ready condition of the loading station 14, the pallet P3 is transferred to the destination indicated in the reference listing RT.

More specifically, the priority pallet reservation location in the machine reservation listing MR and the storage area reservation location in the conveyer occupation listing CS are cleared in the first step 100. The loading station 14 is checked in the second step 101 of the priority pallet transfer instructions to determine if it is in the transfer ready condition, that is, to determine if the pallet P3 is ready to be transferred from the loading station 14. Since the loading station is, as mentioned above, ready in this particular case, the pallet number P3 is read-out by the pallet identification device 41 in the step 103 and is examined, in the step 104, in accordance with the reference listing RT if the pallet P3 is a priority one. Because the pallet P3 is required to be handled on priority basis, as shown in FIG. 4, the destination of the pallet is searched in the next step 105 at the pallet route location of the reference listing RT. Accordingly, the first destination of the pallet P3 is indicated, in the step 107, to be the first NC machine tool MA1 in the first module M1. Since the machine tool is indicated in this particular case, the processing moves to step 108 to examine if the first machine tool MA1 is ready to be loaded with the pallet P3.

The situation in which the machine tool is ready to be loaded with the pallet is referred to as a load ready condition.

When the machine tool is the load ready condition, the processing moves to step 109 to examine in accordance with the machine reservation listing MR if the machine tool MA1 has been reserved by another priority pallet. When the machine tool MA1 has not been reserved, 1 is written in the priority pallet reservation location corresponding to the first machine tool MA1 (FIG. 5) in the step 111 so as to reserve the first machine tool MA1 for the pallet P3. When the machine tool MA1 is not in the load ready condition, the processing moves from step 108 to step 110 to write 1 in the priority pallet reservation location corresponding to the first machine tool MA1. Thereafter, the processing returns to the second step 101 of the instructions to repeat the above mentioned processing.

Since, in this particular case, the machine tool MA1 is ready to be loaded with the pallet P3, the computer 52 examines by the conveyer occupation listing CS (FIG. 6) in the step 116 if the first storage area D1 on the main conveyer 11 and the pallet transfer device 19 are available for the pallet P3. If the first storage area D1 is occupied by other pallets, the processing moves to step 117 to write 1 in the storage area reservation location corresponding to the first storage area D1 in the conveyer occupation listing CS and, thereafter, returns to the second step 101 of the instructions. When the route through which the pallet P3 is to be transferred is available, the processing moves to step 118 to write 1 in the storage area use location corresponding to the first storage area D1 in the conveyer occupation listing CS (FIG. 6) and then moves to stop 120 to write the machine tool number MA1 to which the pallet P3 is to be loaded in the pallet destination location corresponding to the stop position S1 in the destination listing IT. A transfer signal is given in the step 121 to the pallet transfer device 19. Thereafter, the processing returns to the second stop 101 of the instructions so as to repeat the process with respect to the other machine tools.

Although the listings are shown in digital format, it is contemplated that a binary format will be utilized in practice.

The pallet P3 is transferred from the loading station 14 to the main conveyer 11 by means of the pallet transfer device 19 on the first railway R1 and is then carried by the main conveyer 11 to the stop position S1 of the storage area D1 at which the pallet P3 is stopped by the stop member.

When the pallet loading instructions (FIG. 9) are processed in this situation with a predetermined interval, the pallet P3 is loaded into the first machine tool MA1 in the first module M1. The processing of the instructions is described with reference to FIG. 9.

At the first step 130, one of the stop positions S1 to S3 is sequentially selected for examination and, in the next step 131, is examined to determine if the pallet P3 is parked at the stop position S1. Since, in this particular case, the pallet P3 is parked at the first stop position S1, the destination of the pallet P3 is read from the destination listing IT in step 132 and the availability of the pallet transfer device 19 on the second railway R2 is examined in the step 133. When the pallet transfer device 19 is in the process of transferring another pallet, the processing moves to the first step 130 and the processing is repeated with respect to the second stop position S2. When the pallet transfer device 19 on the second railway R2 is available, a loading signal is supplied by the computer 52 in the step 134. The stop member at the first stop position S1 is retracted in accordance with the loading signal and the pallet P3 is indexed into the position right under the second railway R2 so that the pallet P3 may be loaded into the first machine tool MA1.

When the pallet P3 is indexed into the position right under the second railway R2, a limit switch (not shown) is actuated to cancel 1 in the storage area use location corresponding to the stop position in the conveyer occupation listing CS.

When the pallet P3 is loaded, the computer 52 supplies machining data to the machine tool MA1 which, in turn, performs predetermined machining operations on the workpiece W3.

Figure 8:
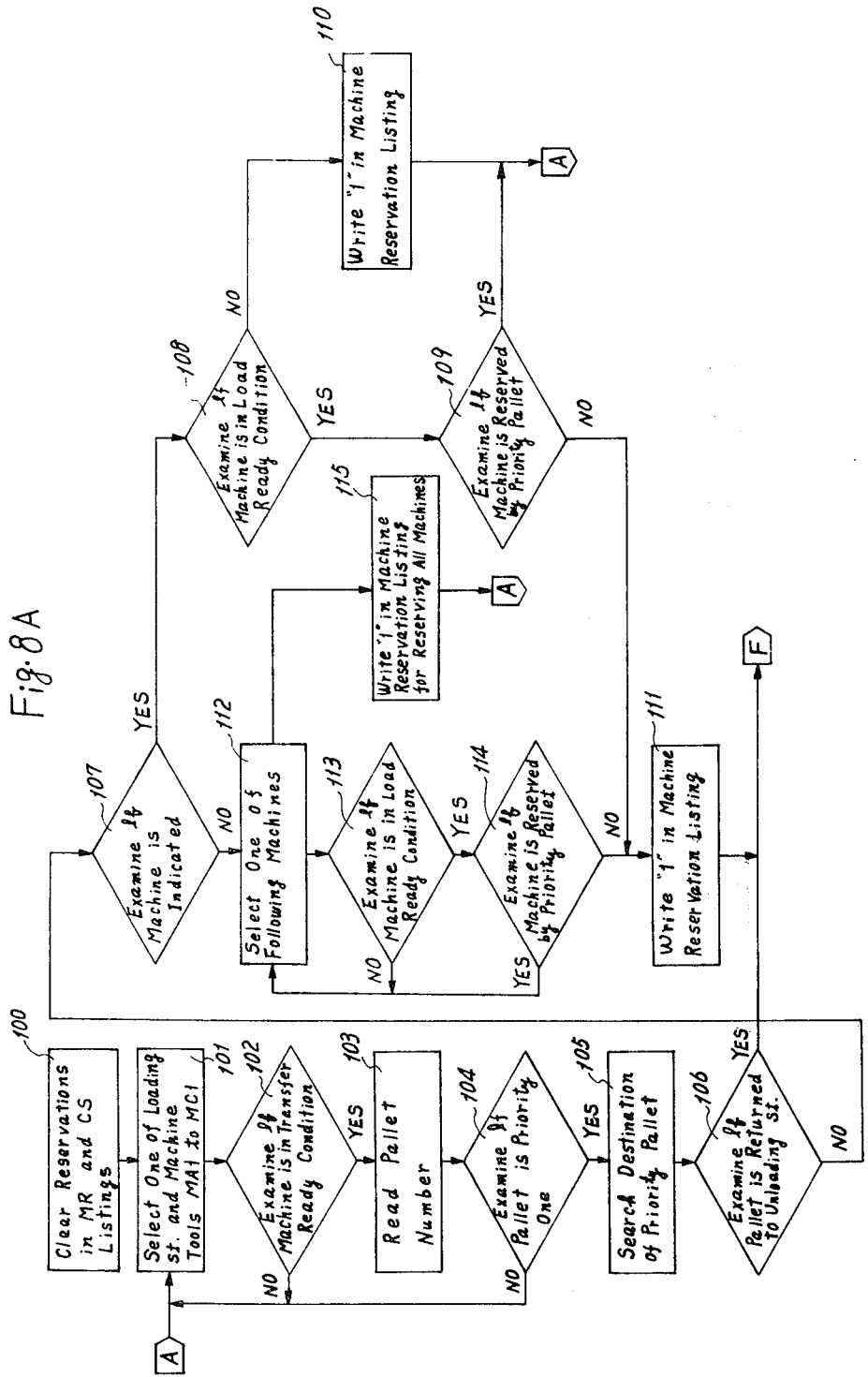
FIGS. 8A and 8B are priority pallet transfer flow charts.

When the machining operations are completed, the machine tool MA1 waits to be unloaded with the pallet P3 in accordance with the priority pallet transfer instructions. In a predetermined sequence, the processing again returns to the priority pallet transfer instructions in which the station 14 is selected in the step 101 and is examined in the step 102 to determine if it is in transfer ready condition. When the loading station 14 is not in transfer ready condition, the processing returns to steps 101, 102 to examine if the machine tool MA1 is in the transfer ready condition. Since, in this particular case, the machine tool MA1 is in the transfer ready condition, the pallet number P3 is read by the pallet identification device 46 in step 103 and is examined in step 104 to determine if the pallet P3 is to be machined on a priority basis. In the next step 105, the destination of the pallet P3 is searched in accordance with the reference listing RT. The number 20 written in the corresponding pallet route location is examined in step 107, the number 20 indicating that the pallet P3 should be transferred into any machine tool in the second module M2. Accordingly, the processing moves to step 113 to check if the machine tool MB1 is in the load ready condition. When the machine tool MB1 is found to be in the load ready condition, the processing moves to the next step 114 to check if the machine tool MB1 has been reserved by another priority pallet. If the machine tool MB1 is in a machining operation or has been reserved by another priority pallet, the processing returns to step 112 to repeat the same procedure with respect to the machine tool MB2. When the machine tool MB2 is also found not to be available, 1 is written in the step 115 in the priority pallet reservation locations corresponding to the machine tools MB1 and MB2. Thereafter, the processing returns to the second step 101 of the priority pallet transfer instructions (FIGS. 8A, 8B). If the machine tool MB2 is in the load ready condition and, furthermore, has not been reserved by another priority pallet, 1 is written in the priority pallet reservation location corresponding to the machine tool MB2 in the machine reservation listing MR (FIG. 5) in the following step 111.

Thereafter, in a similar manner, the following steps 116 to 121 are performed so that the pallet P3 is transferred from the machine tool MA1 into the stop position S2 of the storage area D2.

Figure 9:
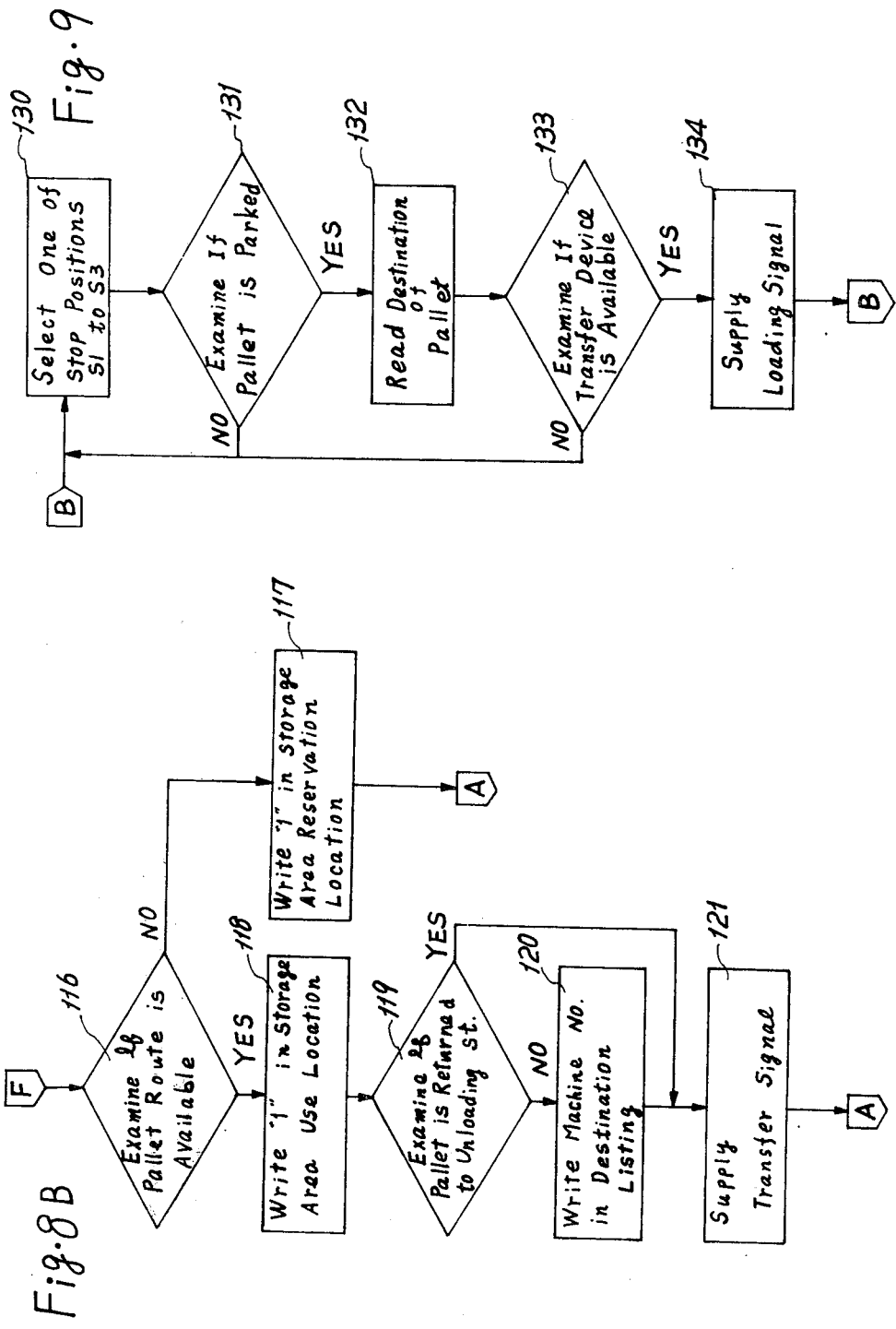
FIG. 9 is a loading flow chart.
Figure 10:
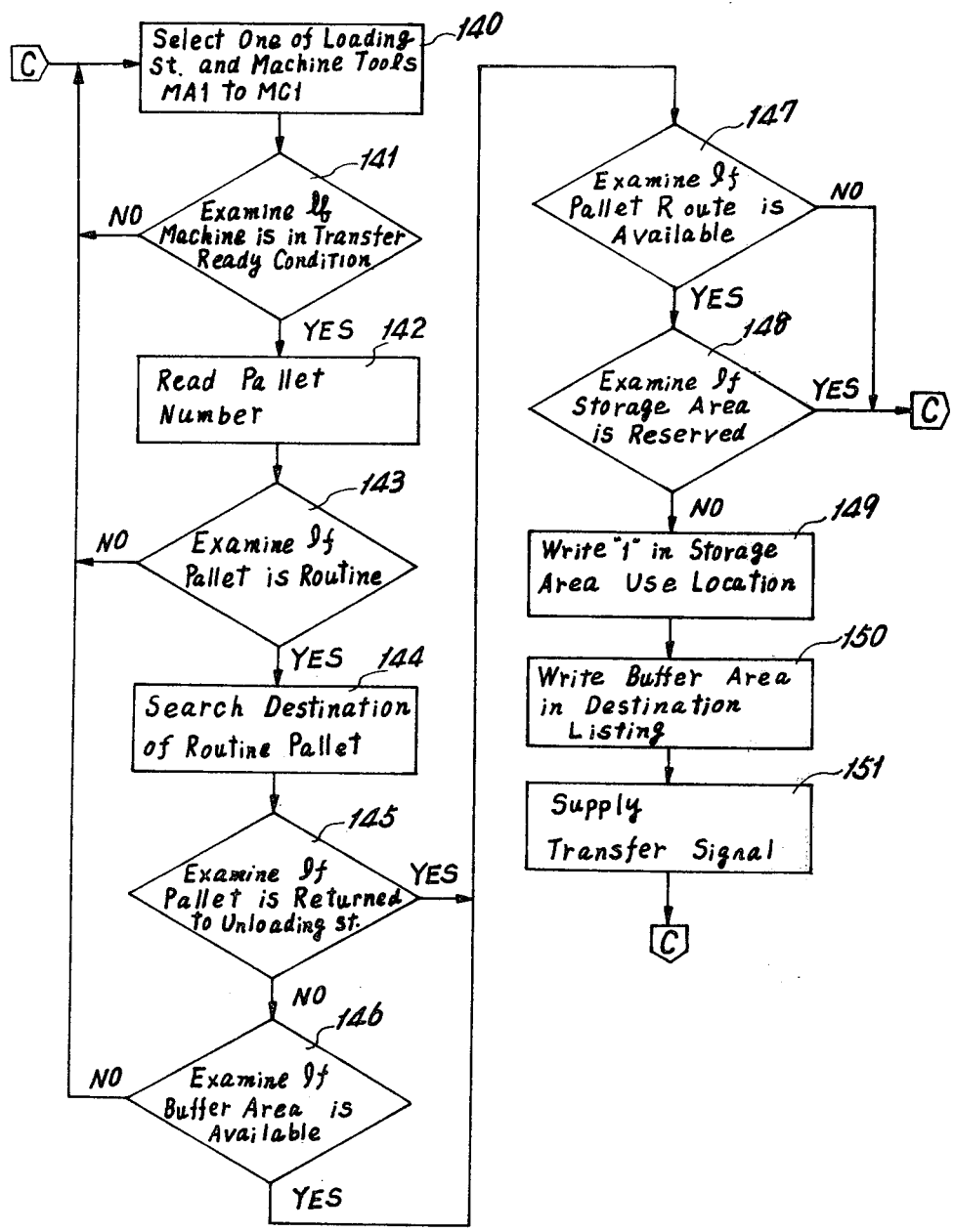
FIG. 10 is a routine pallet transfer flow chart.

Thereafter, the pallet P3 is transferred into the machine tool MB2 in accordance with the pallet loading instructions (FIG. 9). Thus, predetermined machining operations are performed on the workpiece W3 on the pallet P3 by the machine tool MB2.

Upon the completion of the machining operations, the machine tool MB2 assumes a transfer ready condition to wait for the further processing of the priority pallet transfer instructions. After a predetermined period, the priority pallet transfer instructions are again processed. Since the machine tool MB2 is now in the transfer ready condition, the pallet number P3 is read-out by the pallet identification device 49 in the step 103 and is examined in the step 104 to determine if the pallet P3 is machined on a priority basis. Then, the processing is advanced to the following step 105 to search the destination of the pallet P3 in the reference listing RT. Because, in this particular case, the destination is not indicated on the reference listing RT, that is, 00 is written in the pallet route location, the pallet P3 is found in the step 106 to be destined for transfer to the unloading station 15. Thereafter, the processing advances to the next step 116 to examine if the pallet route is available for the priority pallet P3. When the pallet route is available, the pallet P3 is transferred from the machine tool MB2 to the main conveyer 11 by the pallet transfer device supported by the third railway R3 and from there to the return conveyer 12 through a roller conveyer 60. Transfer is further effected from the return conveyer 12 to the unloading station 15 by means of the pallet transfer device 19 supported by the first railway R1. The workpiece W3 is removed by an operator from the pallet P3 at the unloading station 15 and the pallet P3 is returned to the pallet pool 13 by means of the pallet transfer device 19.

The operation of the machine tool apparatus for machining a routine workpiece such as workpiece W4 will now be described.

When the pallet P4 is carried to the loading station 14 in the same manner as above mentioned with respect to the pallet P3, the operator mounts the workpiece W4 on the pallet P4 and pushes the button in order to indicate that the loading station is in the transfer ready condition.

When the routine pallet transfer instructions are initiated after the priority pallet transfer and loading instructions, the pallet P4 begins its transfer of its destination.

In the first step 140 of the routine pallet transfer instructions (FIG. 10) the loading station 14 is selected for examination. Accordingly, the loading station 14 is examined in step 141 to determine if it is in the transfer ready condition. When the loading station is in the transfer ready condition, the processing advances to step 142 to read the pallet number, in this case, the pallet number P4. Thereafter, the pallet number P4 is examined in the next step 143 in accordance with the reference listing RT if the pallet P4 is of a routine nature. Since, in this case, the pallet P4 is of a routine nature as shown in FIG. 4, the processing goes to the next step 144 to search the destination thereof in accordance with the reference listing RT. The first destination of the pallet P4 is in the first machine tool MB1 in the second module M2 since the numerals 21 appear in the pallet route location corresponding to the workpiece W4. Thereafter, the processing moves to the step 146 to examine if the buffer area B2 has the space to store the pallet P4 till the machine tool MB1 assumes the load ready condition. When the buffer area B2 is found to have the necessary space, the processing advances to the step 147 to examine if the pallet route is available. When the pallet route is available for the pallet P4, the processing further advances to the step 148 to examine if the storage area D1 on the main conveyer 11 has been reserved by a priority pallet in accordance with the conveyer occupation listing CS. When the storage area D1 has been reserved by a priority pallet, the processing returns to the first step 140 of the routine pallet transfer instructions and the routine pallet transfer instructions are initiated with respect to the machine tool MA1.

If the storage area D1 has not been reserved, the storage area use location corresponding to the storage area D1 in the conveyer occupation listing CS is designated with a 1 in the step 149. The next step 150 of the processing is to write the buffer area B2 in the pallet destination location corresponding to the stop position S1 in the destination listing IT. Thereafter, the processing is moved to the step 151 to supply a transfer signal to the pallet transfer device 19.

Consequently, the pallet P4 is transferred to the stop position S1 in the same manner as the pallet P3. When the loading instructions (FIG. 9) are initiated, the pallet P4 is transferred into the buffer area B2 by the pallet transfer device 19.

When the routine pallet transfer instructions (FIG. 11) are initiated when the pallet P4 is parked at the ready station Y2, the pallet P4 is loaded onto the machine tool MB1.

In the first step 160, one of the ready stations Y1 to Y3 is sequentially selected and the ready station Y1 is examined for the first time in step 161 to determine if the pallet is parked thereat. When no pallet is parked at the ready station Y1, the processing returns to the step 160 to select the second ready station Y2 and then moves to the step 161. Since, in this particular case, the pallet P4 is parked at the ready station Y2, the processing moves to the step 162 to read the pallet number P4 by the pallet number identification device 44. Thereafter, the destination of pallet P4 is searched in the step 163 in accordance with the reference listing RT. The next step 164 of the processing is to examine if the machine tool is indicated in the destination listing IT. When the machine tool to which the pallet is transferred is indicated, the processing moves to the step 170. Accordingly, the machine tool MB1 is examined in the step 170 if the machine tool MB1 is in the load ready condition. When the machine tool MB1 is found to be in the load ready condition, the processing moves to the next step 171 to examine if the machine tool MB1 has been reserved by another priority pallet in accordance with the machine reservation listing MR. If the machine tool MB1 has been reserved, the processing returns to the first step 160 of the routine pallet loading instructions so that the same instructions are again processed with respect to the ready station Y3. When not reserved, the processing is advanced to the step 168 to examine if the pallet transfer device 19 supported by the railway R3 is available for the pallet P4. When available, a transfer signal is supplied to the pallet transfer device 19 by the computer 52 in the step 169.

In accordance with the transfer signal, the stop member at the ready condition Y2 is retracted, the pallet P4 is advanced into the position right under the third railway R3 and the pallet P4 is loaded into the machine tool MB1 so that predetermined machining operations are performed on the workpiece W4.

In the same manner as above mentioned, when the machining operations by the machine tool MB1 have been completed, the pallet P4 is loaded onto the machine tool MC1 to be subjected to predetermined machining operations.

If it is found in the step 164 that the machine tool to which the pallet is transferred is not indicated in the pallet route location, the processing moves to the step 165 to select another machine tool. The steps 166 and 167 are provided to examine if the machine tool selected at the step 165 is in the load ready condition and to examine if the selected machine tool has been reserved by another priority pallet. When a certain machine tool is found available for the pallet, the processing moves to the step 168. When a machine tool is not available for the pallet, the processing returns to the step 160.

Upon the completion of all the machining operations on the workpiece W4, the pallet P4 is transferred to the unloading station 15 where the oeprator can remove the workpiece W4 from the pallet P4.

According to the present invention, as above mentioned, after the machining operations are performed by a machine tool, the pallet is examined to determined if it is to be machined on a priority basis. If so, the machine tool for following the machining operations is reserved for the priority pallet. If not, the processing advances to examine if the machine tool for the next machining operations has been reserved by a priority pallet. If so, the loading of the routine pallet onto the reserved machine tool is prohibited until such reservation has been cancelled.

Consequently, a workpiece which is to be machined on a priority basis is taken out of sequence and machined earlier than the routine workpieces.

Obviously, many modifications and variations of the present invention are possible in light of the above teachings. It is therefore to be understood that, within the scope of the appended claims, the invention may be practiced otherwise than as specifically described herein.

What is claimed as new and desired to be secured by letters patent of the United States is:

1. Machine tool apparatus for handling routine pallets and priority pallets with loading and unloading stations comprising:
   a plurality of machine tools for performing machining operations on a workpiece mounted on a pallet;
   main conveyer means for carrying a pallet in one direction;
   buffer conveyer means for storing a pallet to be loaded onto a machine tool;
   return conveyer means for returning a pallet to an unloading station;
   pallet transfer means for moving a pallet among the conveyer means, the stations and the machine tools;
   central control means for controlling the machine tools and the conveyer means comprising:
   means to discriminate a priority pallet from a routine pallet mounted on a machine tool or a loading station;
   means to reserve a machine tool onto which a priority pallet is to be loaded to prohibit use of said machine tool with respect to a routine pallet;
   means to control the pallet transfer means to carry a priority pallet from the main conveyer means to one of the machine tools;
   means to control the pallet transfer means to move a routine pallet from the main conveyer means to the buffer conveyer means;
   means to control the pallet transfer means to move a routine pallet from the buffer conveyer means to one of the machine tools when the machine tool on which the routine pallet is to be loaded is not reserved by a priority pallet and is not occupied by another pallet.

2. Machine tool apparatus for handling routine pallets and priority pallets with loading and unloading stations comprising:
   a plurality of machine tools for performing machining operations on a workpiece mounted on a pallet;
   main conveyer means for carrying a pallet in one direction;
   buffer conveyer means for storing a pallet to be loaded onto a machine tool;
   return conveyer means for returning a pallet to an unloading station;
   pallet transfer means for moving a pallet among the conveyer means, the stations and the machine tools;

central control means for controlling the machine tools, the conveyer means and the pallet transfer means comprising:

means to discriminate a priority pallet from a routine pallet mounted on a machine tool or a loading station;

means to reserve a machine tool onto which a priority pallet is to be loaded to prohibit use of said machine tool with respect to a routine pallet;

means to cause the pallet transfer means and the main conveyer means to carry a priority pallet to a predetermined position on the main conveyer means;

means to cause the pallet transfer means to load the priority pallet onto a machine tool when the machine tool is not reserved by another priority pallet.

3. Machine tool apparatus according to claim 2 wherein the central control means further comprises:

means to cause the pallet transfer means and the main conveyer means to carry a routine pallet to a predetermined position on the main conveyer means when the main conveyer means is not reserved by a priority pallet and when the buffer conveyer means is available for the routine pallet;

means to cause the pallet transfer means to carry the routine pallet to the buffer conveyer means;

means to cause the pallet transfer means to carry the routine pallet to a machine tool when the machine tool is not reserved by a priority pallet and is not occupied by another pallet.

4. Machine tool apparatus for handling routine pallets and priority pallets with loading and unloading stations comprising:

a plurality of machine tools for performing machining operations on a workpiece mounted on a pallet;

main conveyer means for carrying a pallet in one direction;

buffer conveyer means for storing a pallet to be loaded onto a machine tool;

return conveyer means for returning a pallet to an unloading station;

pallet transfer means for moving a pallet among the conveyer means, the stations and the machine tools;

central control means for controlling the machine tools, the conveyer means and the pallet transfer means comprising:

means to discriminate a priority pallet from a routine pallet mounted on a machine tool or a loading station;

means to reserve a machine tool onto which a priority pallet is to be loaded to prohibit use of said machine tool with respect to a routine pallet;

means to cause the main conveyer means and the pallet transfer means to transfer a priority pallet to a predetermined position on the main conveyer means;

means to cause the pallet transfer means to transfer the priority pallet from the main conveyer means to the machine tool.

5. Machine tool apparatus according to claim 4 wherein the central control means comprises:

means to discriminate a routine pallet from a priority pallet;

means to determine the destination of the routine pallet;

means to determine if the buffer conveyer means and the main conveyer means are available for the routine pallet;

means to cause the pallet transfer means to transfer the routine pallet to the buffer conveyer means;

means to determine if the machine tool to which the routine pallet is to be loaded is reserved by a priority pallet or is occupied by another pallet;

means to prohibit the loading of a routine pallet if the machine tool is reserved or is occupied by another pallet.

6. Machine tool apparatus according to claim 4 wherein the central control means comprises:

means to determine the destination of the priority pallet;

means to determine if the destination indicates a machine tool onto which the priority pallet is to be loaded.

7. Machine tool apparatus according to claim 4 wherein the central control means comprises means to determine if a machine tool is reserved for another priority pallet.

8. Machine tool apparatus according to claim 6 wherein the central control means comprises:

means to sequentially select machine tools onto which the priority pallet can be loaded;

means to reserve the selected machine tools when the machine tools cannot accept the priority pallet.

9. Machine tool apparatus according to claim 4 wherein the central control means comprises:

means to determine if the pallet transfer means is available for the priority pallet;

means to determine a destination for the priority pallet;

means to cause the pallet transfer means to load the priority pallet onto the machine tool.

10. Machine tool apparatus according to claim 5 wherein the central control means comprises:

means to select machine tools to which the routine pallet can be transferred;

means to determine the destination of the routine pallet if the machine tools selected are not available for the routine pallet.

* * * * *